US008459865B1

(12) United States Patent
Andraka et al.

(10) Patent No.: US 8,459,865 B1
(45) Date of Patent: Jun. 11, 2013

(54) TRACKING HEAT FLUX SENSORS FOR CONCENTRATING SOLAR APPLICATIONS

(75) Inventors: Charles E. Andraka, Albuquerque, NM (US); Richard B. Diver, Jr., Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 339 days.

(21) Appl. No.: 12/955,954

(22) Filed: Nov. 30, 2010

(51) Int. Cl.
*G01K 17/00* (2006.01)
*G01K 7/02* (2006.01)
*G01J 5/14* (2006.01)
*H01L 35/00* (2006.01)

(52) U.S. Cl.
USPC ............. 374/29; 374/121; 374/179; 374/141; 136/206

(58) Field of Classification Search
USPC ................. 374/120, 121, 124, 137, 166, 167, 374/43, 44, 29, 100, 141, 179; 136/200, 206
See application file for complete search history.

(56) References Cited

U.S. PATENT DOCUMENTS

| 3,145,707 | A | * | 8/1964 | Thomason | 126/675 |
|---|---|---|---|---|---|
| 3,286,524 | A | * | 11/1966 | Malone | 374/107 |
| 3,996,460 | A | | 12/1976 | Smith | |
| 4,225,781 | A | | 9/1980 | Hammons | |
| 4,245,153 | A | | 1/1981 | Porter | |
| 4,332,238 | A | | 6/1982 | Garcia | |
| 4,516,018 | A | | 5/1985 | Bodenheimer et al. | |
| 4,522,511 | A | * | 6/1985 | Zimmerer | 374/32 |
| 4,567,365 | A | * | 1/1986 | Degenne | 250/338.1 |
| 4,649,900 | A | | 3/1987 | Trihey | |
| 4,672,191 | A | | 6/1987 | Cofield | |
| 4,717,787 | A | * | 1/1988 | Freppon et al. | 136/226 |
| 4,722,609 | A | * | 2/1988 | Epstein et al. | 374/30 |
| 4,793,553 | A | * | 12/1988 | Berman | 236/91 R |
| 4,812,050 | A | * | 3/1989 | Epstein et al. | 374/1 |
| 4,853,538 | A | * | 8/1989 | Jackson | 250/336.2 |
| 5,990,412 | A | * | 11/1999 | Terrell | 136/225 |
| 6,133,572 | A | * | 10/2000 | Cunningham | 250/339.03 |
| 6,971,792 | B2 | * | 12/2005 | de Ris et al. | 374/29 |

(Continued)

OTHER PUBLICATIONS

J.R. Bean and R.B. Diver, "The CPG 5-kWe Dish-Stirling Development Program", Intersociety Energy Conversion Engin. Conf., SAE International, San Diego, CA. Aug. 3-7, 1992.

(Continued)

*Primary Examiner* — Gail Verbitsky
(74) *Attorney, Agent, or Firm* — Robert D. Watson; Olivia J. Tsai

(57) ABSTRACT

Innovative tracking heat flux sensors located at or near the solar collector's focus for centering the concentrated image on a receiver assembly. With flux sensors mounted near a receiver's aperture, the flux gradient near the focus of a dish or trough collector can be used to precisely position the focused solar flux on the receiver. The heat flux sensors comprise two closely-coupled thermocouple junctions with opposing electrical polarity that are separated by a thermal resistor. This arrangement creates an electrical signal proportional to heat flux intensity, and largely independent of temperature. The sensors are thermally grounded to allow a temperature difference to develop across the thermal resistor, and are cooled by a heat sink to maintain an acceptable operating temperature.

31 Claims, 18 Drawing Sheets

U.S. PATENT DOCUMENTS

| | | | |
|---|---|---|---|
| 7,079,944 B2 | 7/2006 | Litchfield et al. | |
| 7,109,461 B2 | 9/2006 | Lasich | |
| 7,823,582 B2 * | 11/2010 | Harrison et al. | 126/589 |
| 2004/0154299 A1 * | 8/2004 | Appa et al. | 60/641.8 |
| 2011/0073149 A1 * | 3/2011 | Ladner | 136/200 |
| 2011/0094556 A1 * | 4/2011 | Stark | 136/205 |
| 2011/0197880 A1 * | 8/2011 | Murthy et al. | 126/683 |
| 2011/0241549 A1 * | 10/2011 | Wootton | 315/117 |
| 2012/0097853 A1 * | 4/2012 | Ouvrier-Buffet et al. | 250/349 |
| 2012/0192910 A1 * | 8/2012 | Fowler et al. | 136/206 |

OTHER PUBLICATIONS

R. B. Diver and Charles E. Andraka, Integration of the Advanced Dish Develpment System, Proc. International Solar Energy Conf, Hawaii, Mar. 15-18, 2003.

R.B. Diver et al, "Status of the Advanced Dish Development System Project," International Solar Energy Conf., Hawaii, Mar. 15-18, 2003.

Maish, Alexander B., "The Solartrak Solar Array Tracking Controller", Sandia Report SAND90-1471, Jul. 1991.

* cited by examiner

Sec A-A

Sec A-A

Sec A-A

TRACKING HEAT FLUX SENSORS FOR CONCENTRATING SOLAR APPLICATIONS

STATEMENT REGARDING FEDERALLY SPONSORED R&D

The United States Government has rights in this invention pursuant to Department of Energy Contract No. DE-AC04-94AL85000 with Sandia Corporation.

BACKGROUND OF THE INVENTION

The present invention relates to tracking heat flux sensors used to accurately control the tracking of focused solar light for concentrating solar collectors, such as point-focus (dish) and line-focus (trough) collectors; as well as concentrating photovoltaic systems. The sensors can be passively cooled and mounted adjacent to the focus of the solar collectors.

Concentrating Solar Power (CSP) systems convert the energy in concentrated sunlight into mechanical, electrical, or chemical energy. Accurate tracking of concentrating solar collectors is needed to enable higher concentration ratios and/or minimize the amount of reflected solar energy that misses the receiver. Open and closed-loop tracking are the two basic approaches for pointing the collector at the sun as it crosses the sky. In open-loop tracking, the collector is pointed at the calculated position of the sun. This requires that the accuracy of the tracking system, collector, and its physical and angular position must be equal to or better than the desired tracking accuracy. Shaft encoders on the drives and the use of inclinometers and compasses have been used to establish collector tracking position. However, systematic errors or the failure to accurately position the collector relative to the earth-sun coordinates can result in tracking errors.

Closed-loop tracking sensors typically detect the actual position of the sun and tracking is adjusted until the tracking matches the sun's position. Traditional closed-loop tracking, such as those described in U.S. Pat. Nos. 3,996,460, 4,225,781, 4,235,153, 4,672,191, and 7,109,461, use sun (light) sensors mounted on the tracking structure. The sun sensors are typically pairs of photovoltaic solar cells with one pair of sensors per tracking axis. Photo-resistors or other sensor types can also be used. Lens or shadow bands aligned with the optical axis of the collectors equally illuminate both sensors in the pair, resulting in an equal signal from the pair when properly tracking. Misalignments between the sensor and collector axis causes one of the sensors to be illuminated more than the other, resulting in an error signal that is used to correct the tracking error. Misalignment of the sun sensor, or deflections of the structure, can lead to differences between the measured and actual sun position relative to the collector/receiver axis. In addition, unequal distribution of dirt, or unequal response characteristics of the sensors can lead to tracking errors.

It is also possible to use thermal receiver temperature sensors to provide a closed-loop tracking signal. The temperature-dependence of the electrical resistance of wire has been proposed as a way to sense heat flux near the aperture of a point focus dish collector in U.S. Pat. Nos. 4,332,238 and 4,516,018. In addition, early in the U.S. Department of Energy trough development program, Sandia National Laboratories built and tested a closed-loop tracking system consisting of a pair of fine wires installed along each side and parallel to the absorber tube axis. The wires changed resistance as a function of their temperature. This approach was shown to be more accurate than a shadow-band tracker (Boultinghouse, Karlan, "Development of a Solar Flux Tracker for Parabolic Trough Collectors," SAND82-1600, Sandia National Laboratories, Albuquerque, N. Mex., September 1982).

However, because thermocouples and heated wires measure temperature, they respond slowly to a falling flux level (e.g., when the tracking adjusts away from the sensor). The slow response can cause unstable control. They can also overheat or melt if not adequately thermally coupled to a heat sink. The competing requirements of fast temperature response vs. having adequate thermal mass to avoid overheating make accurate and responsive closed-loop tracking with thermocouples difficult. In addition, wind-driven convective heating from a thermal receiver can unevenly and unpredictably heat one sensor relative to its pair, and indeterminately affect tracking response. Controlling tracking using receiver temperatures can be susceptible to errors from non-uniform soiling, shading, frost on the collector, or engine degradation.

SUMMARY OF THE INVENTION

The present invention relates to the use of innovative tracking heat flux sensors located at or near the solar collector's focus for centering the concentrated image on a receiver assembly. With flux sensors mounted near a receiver's aperture, the flux gradient near the focus of a dish or trough collector can be used to precisely position the focused solar flux on the receiver. When mounted in pairs on opposite sides of the focal point, near the edges of the focus even small variations in the position of the focus relative to the flux sensors will cause the flux intensity on one sensor to increase and the other to decrease. This difference in the sensors' signal intensity is used to adjust tracking. Because the gradient of the concentrated flux distribution is greater at the focus, locating the sensors at or near the focal plane maximizes the centering potential of the method.

The heat flux sensor of the present invention comprises two closely-coupled thermocouple junctions with opposing electrical polarities, which are separated by a thermal resistor. This arrangement creates an electrical signal proportional to heat flux intensity, and largely independent of temperature. The sensors are thermally grounded to allow a temperature difference to develop across the thermal resistor; and are cooled by a heat sink to maintain an acceptable operating temperature.

This approach can be applied to "train" open-loop tracking and facilitate accurate open-loop tracking and a reliable transition between open-loop and closed-loop tracking. By tracking closed-loop and periodically recording the discrepancy between open-loop and the closed-loop tracking positions, regression analysis can be applied to calculate collector positional and structural errors as described in (Diver, R. B., Andraka, C. E., Rawlinson, K. S., Moss, T. A., Goldberg, V., Thomas, G., 2003, "Status of the Advanced Dish Development System Project," International Solar Energy Conference Proceedings, Kohala Coast, Hawaii Island, Hi.) and in U.S. Pat. No. 7,079,944, as well as in Maish, Alexander B., "The Solartrak Solar Array Tracking Controller", Sandia Report SAND90-1471, July, 1991. These errors include gear ratio of the drives, east/west and north/south tilts of the drive axis, offsets, and axis orthogonality (in the case of two axis tracking). These regressions also incorporate gravity sag of the collector.

It is therefore a primary object of the present invention to provide a tracking heat flux sensor which will respond accurately to solar tracking of point focus dish and line focus trough solar collectors.

It is another object of the present invention to provide a tracking heat flux sensor that responds sufficiently fast to enable rapid and graceful transitions between open and closed-loop tracking.

It is a further object of the present invention to provide a tracking heat flux sensor that is low cost to manufacture and install.

It is still another object of the present invention to provide a tracking heat flux sensor and methodology that is reliable and durable.

These and other objects of the present invention will become apparent to those skilled in this art upon reading the accompanying description, drawings, and claims set forth herein.

DETAILED DESCRIPTION OF THE INVENTION

The tracking heat flux sensor of the present invention comprises two closely-coupled thermocouple junctions with opposing electrical polarity that are separated by a thermal resistor. This arrangement creates an electrical signal proportional to heat flux intensity, and largely independent of temperature. The sensors are thermally grounded to allow a temperature difference to develop across the thermal resistor; and are cooled by a heat sink to maintain an acceptable operating temperature.

In one embodiment, a tracking heat flux sensor can comprise: an absorber plate made of a first metal; a thermal bus made of the first metal; a thermal resistor plate made of a second metal different than the first metal, wherein the thermal resistor plate is attached to, and sandwiched in-between, the absorber plate and a near end of the thermal bus; a first dissimilar metal thermocouple junction located at an interface between the absorber plate and the resistor plate; a second dissimilar metal thermocouple junction located at an interface between the resistor plate and the thermal bus; a heat sink attached to a far end of the thermal bus; a first electrical lead connected to the absorber plate; a second electrical lead connected to the thermal bus; and means for measuring a voltage difference (e.g., a voltmeter) across the first and second electrical leads caused by a Seebeck effect generated when a localized heat flux is applied to the absorber plate and heat is conducted through the thermal resistor to the thermal bus and then to the heat sink, thereby causing a temperature difference to develop between the interfaces at the first and second dissimilar metal thermocouple junctions.

Figures 1, 5A:
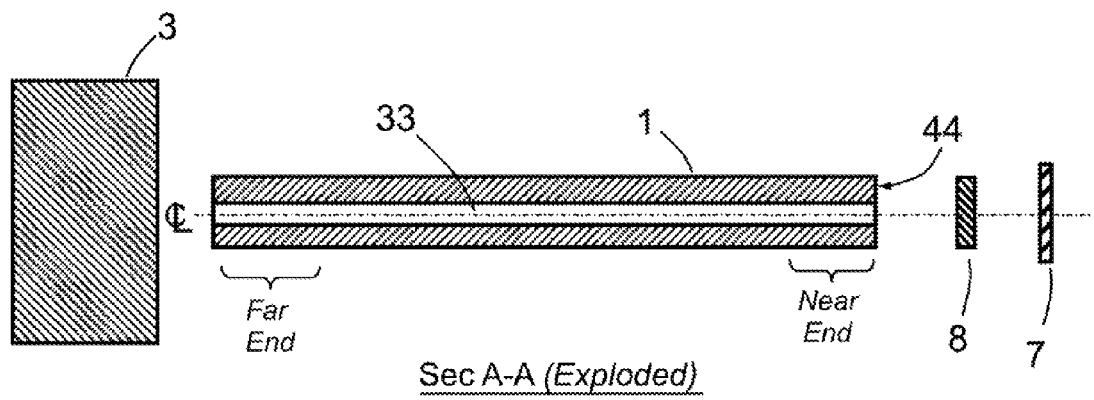
FIGS. 5A-1, 5A-2, 5B, 5C, 5D, and 5E are schematic cross-sectional views of various embodiments of co-axial tracking heat flux sensors.

FIG. 1 illustrates another embodiment of a tracking heat flux sensor. Its main components include a thick copper bus 1 (e.g., bar, plate, rod) to promote good thermal and electrical conduction from the heated sensing tip 2 to a heat sink plate 3, which serves as a massive, thermally-grounded heat sink. In a prototype sensors tested over a period of several years at Sandia National Laboratories the copper buses 1 were rectangular bars nominally 6 mm (¼ inch) thick, 5 cm (2 inches) wide, and about 15 cm (6 inches) long. The sensing tips 2 were cut to a point to improve its time-response. Under the tip, a first constantan wire 4 was silver-soldered into the copper sensing tip 2, forming a first type-T thermocouple junction. A second constantan wire 5 was soldered at the back end (thermally grounded end) of the copper bus 1, providing a second type-T thermocouple junction. These two electrically-opposed junctions, combined with the well-grounded thermal path through the copper bus 1, create a heat flux gauge. The resulting electrical signal (voltage) is proportional to the temperature difference between the two thermocouple junctions; one each located at the two ends of the copper bus. The wide copper heat conduction path, and good thermal ground, provides rapid sensor response to a falling heat flux. A ceramic plate 6 can be used to shade most of the sensor from incoming concentrated sunlight, exposing only the tip. This reduces the bulk temperature and thermal load on the heat sink. The prototype proved robust, and since the sensors measure the temperature difference between the two thermocouple junctions, convective heating of one sensor relative to its pair does not affect response (Richard B. Diver and Charles E. Andraka, 2003, "Integration of the Advanced Dish Development System," International Solar Energy Conference Proceedings, Kohala Coast, Hawaii Island, Hi.).

The name "constantan" refers to a wide range of copper-nickel alloys, generally comprising copper alloyed with 35 to 50 wt % nickel. Examples of constantan compositions for thermocouple applications include, but are not limited to: (a) Cu 55 wt %+Ni 45 wt %; (b) Cu 55 wt %+Ni 44 wt %+Mn 1 wt %; and (c) Cu 57 wt %+Ni 43 wt %. These alloys have been manufactured under such trade names as Advance™, Copnic™, Cupron™, Eureka™, Excelsior™, Ferry™, Ideal™, and Thermoconstantan™. The thermal conductivity of constantan thermocouple alloys ranges from 19-22 W/m-K; compared to 400 W/m-K for pure copper. Copper/constantan (Type T) junctions have the advantage of having a high Seebeck coefficient, with a nearly linear voltage vs. temperature response.

Figure 1A:
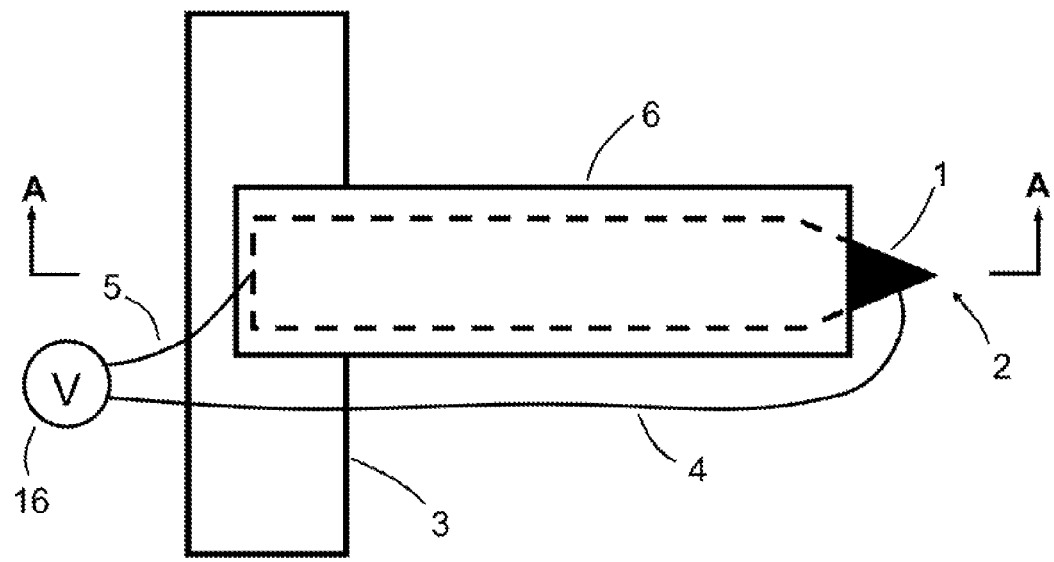
FIG. 1A is a schematic top view showing an embodiment of a tracking heat flux sensor.
Figure 1B:
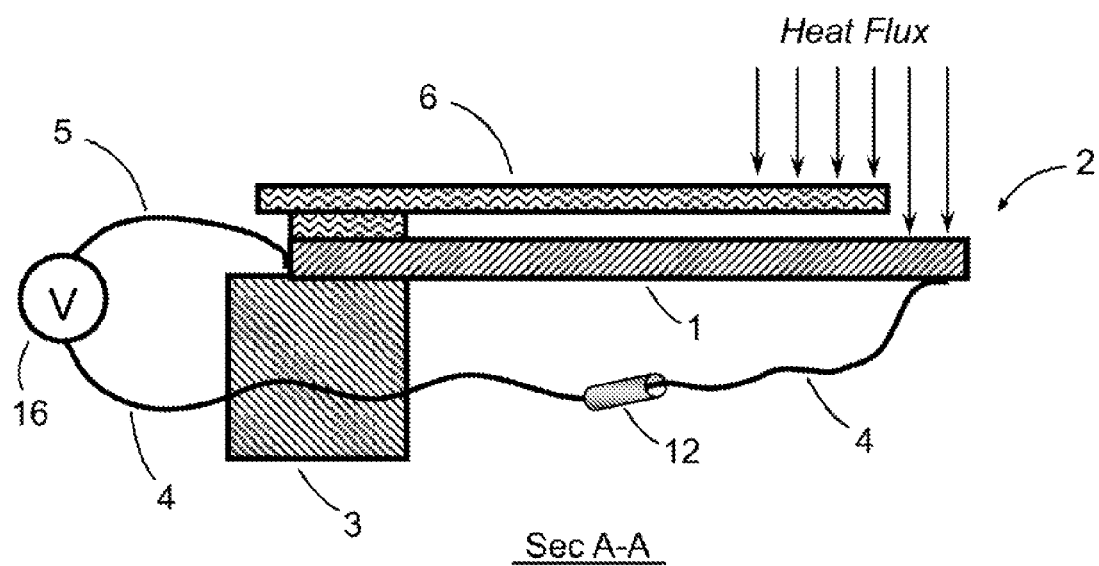
FIG. 1B is a schematic cross-sectional side view showing an embodiment of a tracking heat flux sensor.
Figure 2A:
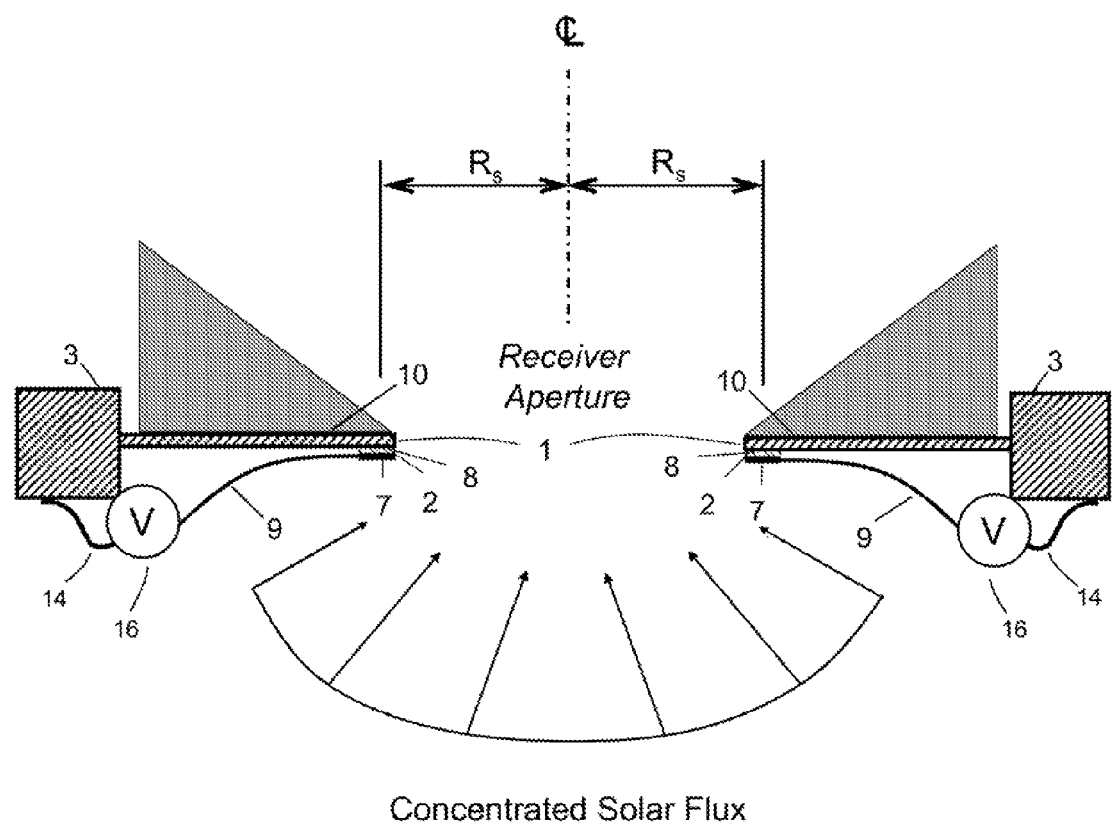
FIG. 2A is a schematic cross-sectional side view showing a pair of tracking heat flux sensors for a point focus solar collector.

FIG. 2A illustrates another embodiment of the present invention, comprising a pair of a tracking heat flux sensors placed on opposite sides and equidistant (i.e., at the same radial distance, $R_s$, from the centerline of the Receiver Aperture) of a concentrated beam of solar flux.

Figure 2B:
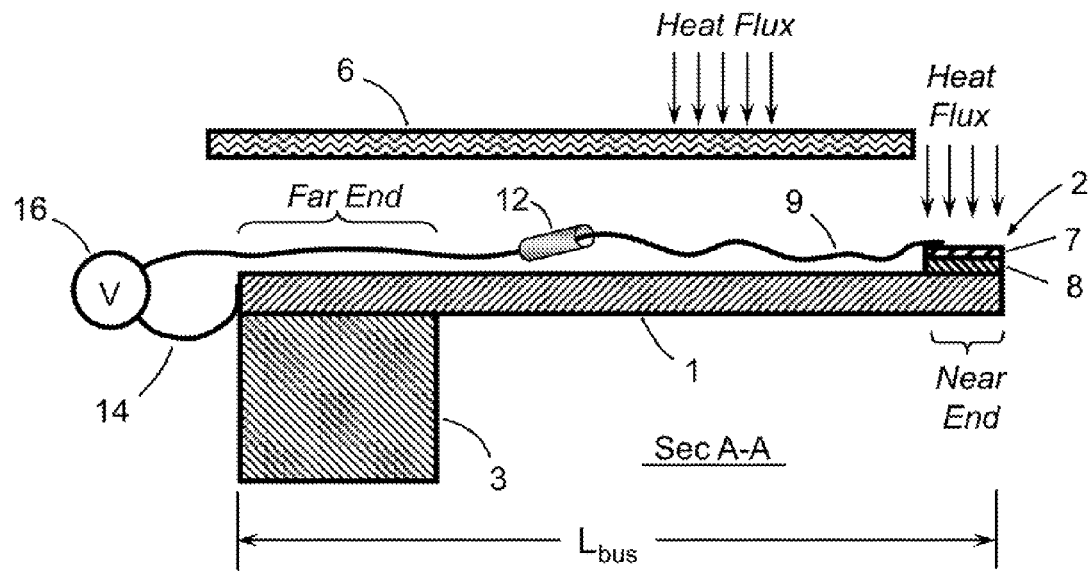
FIG. 2B is a schematic cross-sectional side view showing an embodiment of a tracking heat flux sensor.

FIG. 2B is a schematic cross-sectional side view showing an embodiment of a tracking heat flux sensor. Each flux sensor utilizes a thermal bus 1 (e.g., a copper plate, bar, rod, thin-walled tube, or thick-walled tube) and a heat absorber plate 7 (e.g., copper), with a thermal resistor plate 8 made of a dissimilar metal (e.g., Constantan alloy), that is sandwiched in-between a near end of the thermal bus 1 and absorber plate 7 The two interfaces between the two dissimilar metal plates (e.g., copper and constantan) form electrically-opposite thermocouple junctions (e.g., Type T); with the interface between the absorber plate 7 and the resistor plate 8 forming a sensing tip 2. Sensing tip 2 is illustrated in FIG. 2D, which shows the first thermocouple junction at the interface between absorber plate 7 and thermal resistor plate 8; and the second thermocouple junction at the interface between thermal resistor plate 8 and the near end of thermal bus 1. Tip 2 is thermally grounded to bus 1, and heat sink 3 is attached to a far end of the thermal bus 1. Applying a concentrated solar flux on the sensor tip 2 causes a large temperature difference across the low-conductivity thermal resistor plate 8. This temperature difference between the two junctions results in a Seebeck voltage (e.g., measured by voltmeter 16) that is proportional to heat flux, and which can be measured between copper lead 9 and any point where the bus 1 connects to the heat sink 3. Copper wires 9 and 14 carry the signals to a voltmeter 16 or collector controller (not shown) without need for any temperature compensation. Electrical lead 9 is typically insulted with ceramic beads or a ceramic woven-fiber sheath 12 to prevent shorting out to bus 1. The length, $L_{bus}$, of thermal bus 1 can range from 10 to 100 cm, and more typically from 30-50 cm. Alternatively, the length of the thermal bus, $L_{bus}$, can be sufficiently long so that the far end of bus 1 (where the heat sink 3 is attached) is located where the solar heat flux is minimal or zero. Absorber plate 7 and thermal resistor plate 8 can have a square shape (when viewed from the top) with a length of a side from, for example, 1-2 cm. Optionally, a heat shield 6 can be used to shade electrical lead 9, heat sink 3, and any part of thermal bus 1 that is not covered by sensor tip 2, from the incident solar heat flux, which reduces the total heat load to heat sink 3. Heat shield 6 can be made of a ceramic material, and can be painted white, coated with a white solar-reflective protective coating, or have a natural white color. It is desirable that any white protective coating also has a high infrared emissivity.

Figure 2C:
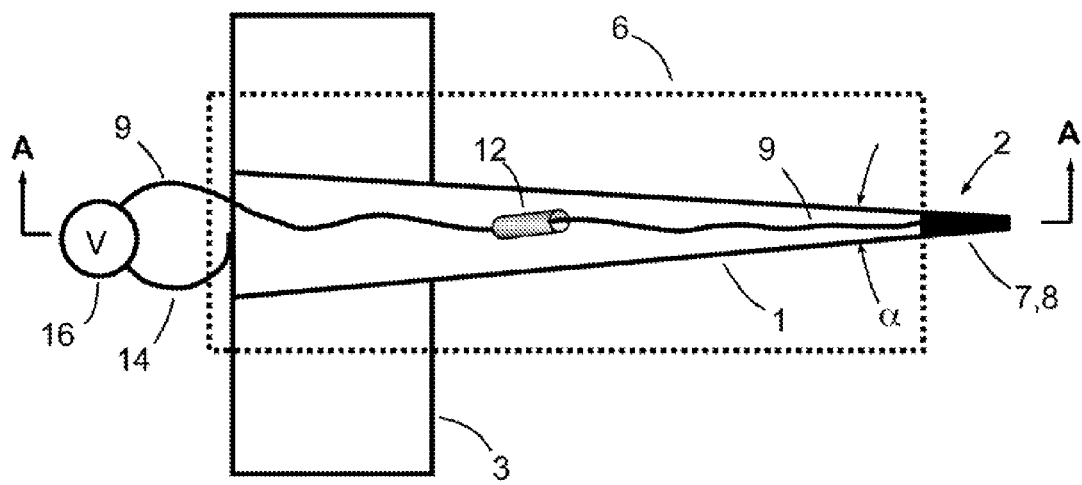
FIG. 2C is a schematic top view of the embodiment of FIG. 2B.
Figure 2D:
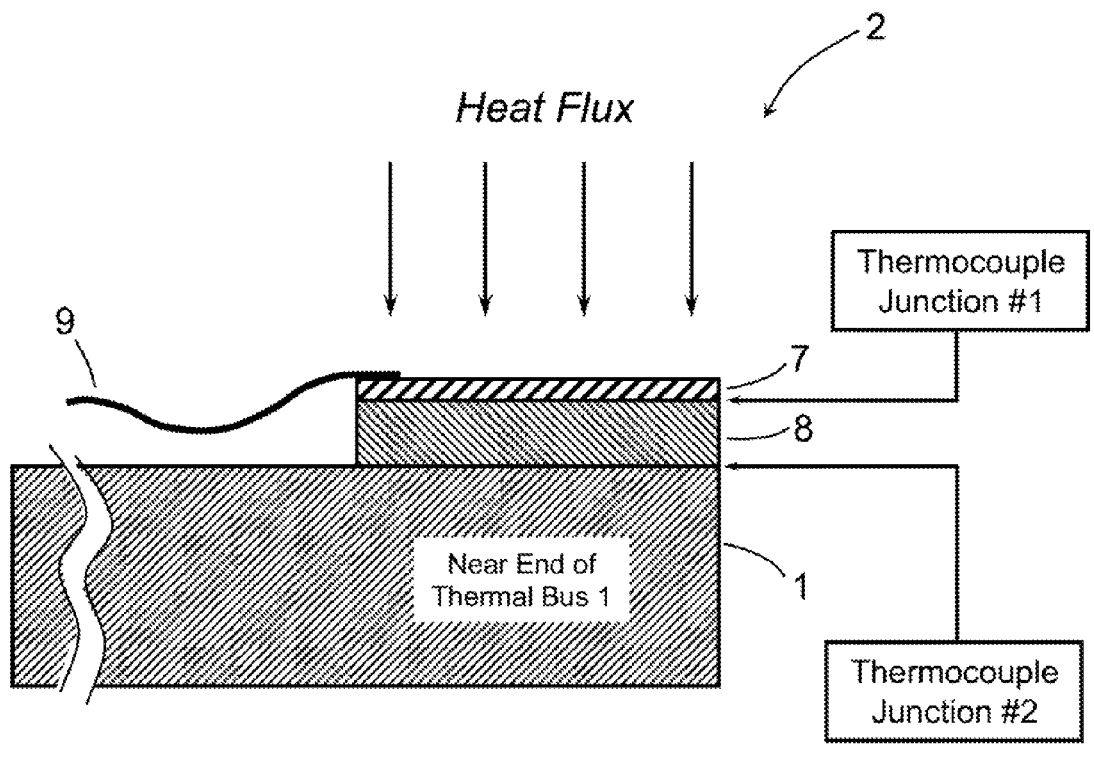
FIG. 2D is a schematic cross-sectional side view showing an embodiment of a tracking heat flux sensor.

Alternatively, as shown in FIG. 2C, thermal bus 1, absorber plate 7 and thermal resistor plate 8 can have a triangular (wedge) shape. Thermal bus 1 can be a thick copper plate cut into a long, thin wedge. The plate's wedge angle, $\alpha$, can range from 5 to 30 degrees, Alternatively, it can range from 10 to 20 degrees. The wedge plate can be, for example, 2.5 cm (1 inch) wide at the back, and taper to a point at the tip; and absorber plate 7 and thermal resistor plate 8 can be about 0.5 cm long and a few mm wide: The length of the copper base in each sensor can be, for example, approximately 15 cm (6 inches). The pointed wedge (tip 2) provides a smaller cross section to intercept sunlight, thereby reducing the total thermal load to the heat sink 3.

The thermal receiver housing structure itself, or cooling fins attached to the copper bus 1, or other cooling means can be used as the heat sink 3. Alternatively, active cooling (e.g., air or water) with forced coolant flow inside of coolant channels (not shown) embedded in copper bus 1 and/or heat sink 3 can be used to increase the heat capacity of the sensors. Alternatively, thermal bus 1 and/or heat sink 3 can comprise a "heat pipe" type heat transfer device (e.g., an evaporating/condensing fluid with a porous wick) for enhancing the rate of heat transfer from the hotter near end to the colder far end of thermal bus 1.

Heat sink 3 can be actively cooled with, for example, forced air or water coolant flow. Heat sink 3 can comprise active cooling means for actively-cooling the heat sink, for example: air-cooling, liquid-cooling (e.g., water plus ethylene glycol antifreeze), refrigerant-cooling, and evaporative-cooling. The thickness of absorber plate 7 can range, for example, from 0.05 mm to 3 mm. For applications where there is a steep heat flux gradient profile (see, for example, FIG. 6), the heat sink 3 can be located a distance that is sufficiently-far away from the point at which the absorber plate 7 absorbs incident heat flux so that the heat sink itself is not heated by the incident heat flux in any appreciable amount. In other embodiments, heat sink 3 can be located more than 10 cm away from absorber plate 7. In other embodiments, heat sink 3 can be located at no more than 20 cm away from absorber plate 7. In other embodiments, heat sink 3 can be located directly underneath absorber plate 7.

The location of the heat sink 3 relative to the sensing tip 2 (i.e., the distance between heat sink 3 and absorber plate 7) is variable in the present invention. In some embodiments, heat sink 3 can be located directly underneath, or very close to, sensing tip 2. However, because of physical limitations/constraints, or in order to minimize the total heat loads, the heat sink 3 may need to located at some distance away from sensing tip 2. The use of an optional heat shield 6 can also affect the type of heat sink used (e.g., passive or active cooling) and/or the positioning of the heat sink. In embodiments where the heat sink 3 is located some distance away from sensing tip 2 (e.g., 10-20 cm away, or more), then the thermal bus 1 serves two purposes: 1) as a structural support arm/beam to extend the sensing tip 2 into a part of the incident heat flux profile where the flux is greater, and 2) as a "bus" or "pipe" to efficiently conduct the heat absorbed by sensing tip 2 back to heat sink 3.

In FIGS. 2A, 2B and 2C both electrical leads are made of copper, and a relatively small amount of constantan is used. Thermal bus 1 can be attached to heat sink 3 in a number of ways, including, for example, mechanical bolting, soldering, or brazing. Thermal resistor plate 8 can be attached to absorber plate 7 and to bus 1 by a variety of joining techniques, including, but not limited to: soldering, brazing, diffusion bonding, hot isostatic pressing (HIP), friction welding, explosion bonding, e-beam welding, laser welding, and stir welding. The same, or other, techniques can be used to attach electrical lead 9 to absorber plate 7. A joining technique that can withstand high temperatures without melting or detaching is preferable (e.g., diffusion bonding, hot isostatic pressing (HIP), friction welding, explosion bonding, e-beam welding, laser welding, and stir welding). The thickness of absorber plate 7 can range, for example, from 1 to 3 mm thick, with a thinner plate giving a faster thermal response.

Thermal bus 1 can be made of pure copper, or a copper alloy with a thermal conductivity greater than or equal to 200

W/m-K, or pure aluminum, or any aluminum alloy. In particular, thermal bus 1 can be made of an oxide-dispersion strengthened (ODS) copper alloy, (e.g., alumina dispersion strengthened), such as Glidcop™ AL-15 (Cu-0.3 wt. % $Al_2O_3$), which has high thermal conductivity and high yield strength at elevated temperatures. Alternatively, an oxide-dispersion strengthened (ODS) aluminum alloy, or any other high conductivity alloy or composite, can be used for bus 1.

When heat flux is removed from a tracking sensor tip 2 (e.g., due to mis-tracking, clouds, etc.), the temperatures of the two copper/constantan junctions rapidly equilibrate, resulting in no voltage signal. Even if one sensor is convectively heated relative to its pair, the heating will be uniform through the thickness, causing both junctions to increase at the same rate and resulting in a zero voltage signal. Because closed-loop tracking is accomplished by comparing the voltage responses between pairs of flux sensors, it is not necessary to calibrate the sensor's voltage response as a function of flux. Proper tracking response can be achieved as long as the construction and positioning of the two sensors is identical.

Prototypes of the flux sensor design illustrated in FIG. 2C were made from 6 mm (¼ inch) thick copper plate cut into a long, thin wedge, 2.5 cm (1 inch) wide at the back, and a point at the tip. The length of the copper base in each sensor was approximately 15 cm (6 inches). The pointed wedge provides a smaller cross section to intercept sunlight, thereby reducing the heat sink thermal load. A small patch of 1 mm (0.040 inch) thick constantan sheet was silver-soldered to the top of the tip, and then a copper wire soldered to the top of the constantan patch. The lead copper wire 9 was insulated with ceramic beads (not shown) and sheathed to insulate and shield it from concentrated flux. The cold end of the wedge (i.e., far end of bus 1) is thermally well-connected to a finned heat sink 3. Because the thermal conductivity of constantan is much lower than copper, a reasonable temperature gradient and signal is generated. The dimensions for our prototypes are illustrative and not critical.

Figure 3A:
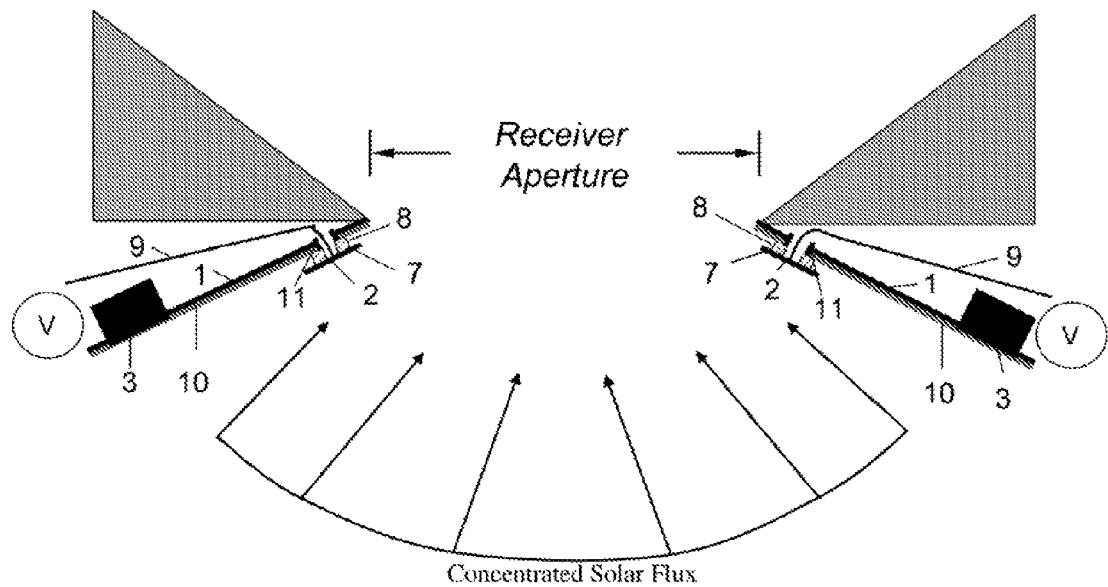
FIG. 3A is a schematic cross-sectional side view showing a pair of tracking heat flux sensors integrated into a conical slew plate for a point focus solar collector.

Proposed fabrication variations include machining the thermal buses(s) 1 and heat sink(s) 3 out of the same plate or block of copper, therefore, simplifying the fabrication and installation. The copper plate could also serve as the slew plate for safely tracking the concentrated flux onto and off of the receiver. The slew plate 10 could be flat as illustrated in FIG. 2A, or conical shaped as illustrated in FIG. 3A. A conical design has the advantage of reducing peak flux intensities on the aperture assembly when the collector slews on and off sun.

Figure 3B:
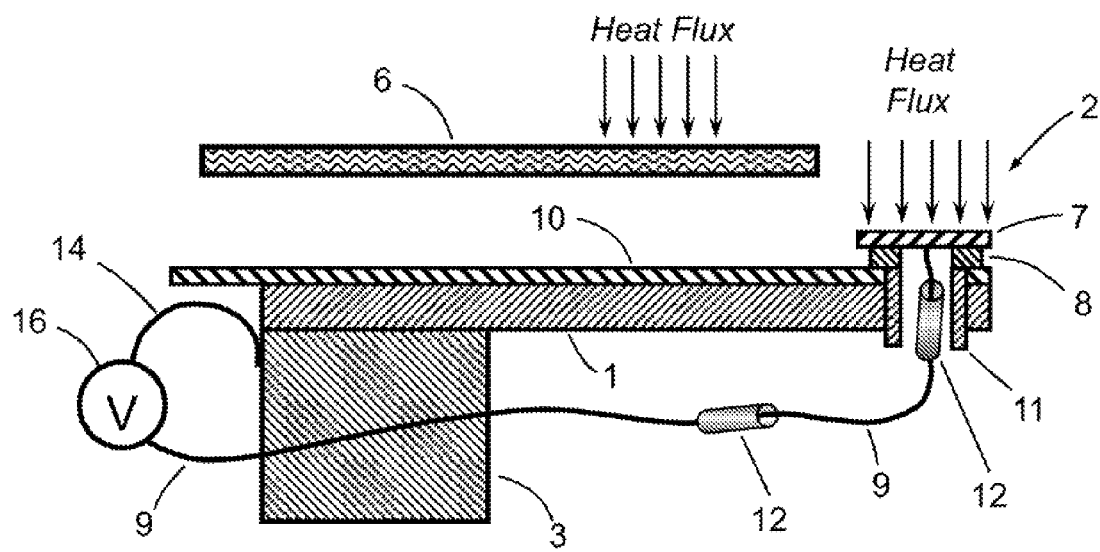
FIG. 3B is a schematic cross-sectional side view showing an embodiment of a tracking heat flux sensor.

The embodiment illustrated in FIGS. 3A and 3B also places the thermal bus 1, electrical lead 9, and heat sink 3 on the shaded side of the slew plate 10. The solar flux is intercepted by a circular copper absorber disk 7, then flows through constantan washer-shaped resistor sheet 8, through the conical slew plate 10 passing through a copper tube 11, into the copper bus 1, and finally out through the heat sink 3. Flux intensity is proportional to the voltage (e.g., measured by voltmeter 16) between the copper leads 9 and the copper bus 1. Thermal bus 1 could also serve as the slew plate 10, or even made from aluminum or other suitably heat conductive and heat resistant material, assuming there is a sufficient Seebeck coefficient for generating an electric signal between it and the selected material for resistor sheet 8.

In FIGS. 3A and 3B, thermal bus 1 is located on an shaded underside (backside) of a slew plate 10; the thermal resistor plate 7 has a washer-shaped geometry with a central hole; the slew plate 10 has a through hole that lines-up with the central hole of the washer-shaped resistor 8; a copper bushing 11 that surrounds the through hole through the slew plate 10; and wherein the first electrical lead 9 passes through the central hole of the washer-shaped resistor and through the through hole through the slew plate inside of the copper bushing 11, and then is routed along the underside of the slew plate to a voltmeter 16.

Figures 2, 5A:
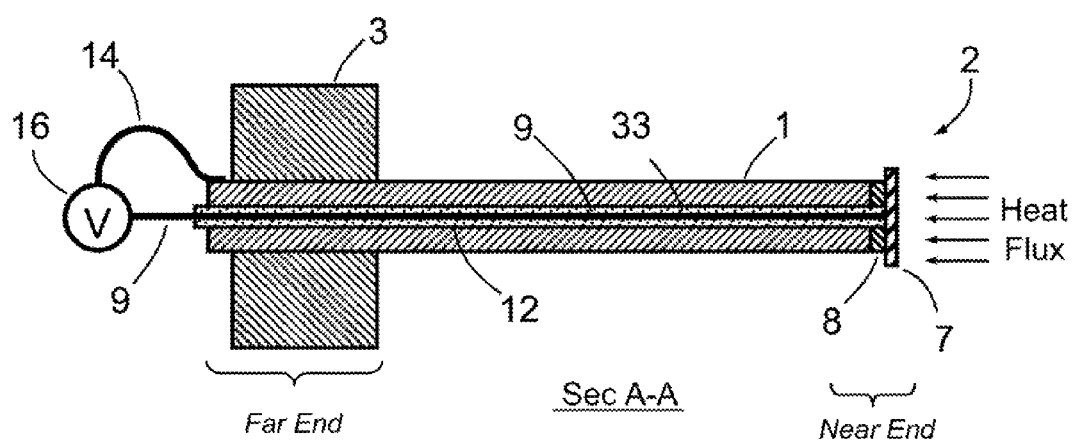

The design dimensions of our tracking heat flux sensors involve tradeoffs. Larger dimensions result in more robust designs but higher material costs. Increasing the thickness of constantan increases the electrical signal, but increases the thermal response lag time. In one embodiment, by series-connecting multiple flux sensors, it is possible to achieve both fast thermal response and a higher voltage signal, but at the expense of increased cost and complexity. Series connection can be accomplished by connecting the electrical lead 9 of a sensor with the bus 1 of a neighboring sensor. Series connection can be utilized to increase the voltage signal, which is typically less than one millivolt for the prototype illustrated in FIG. 2.

Figure 4A:
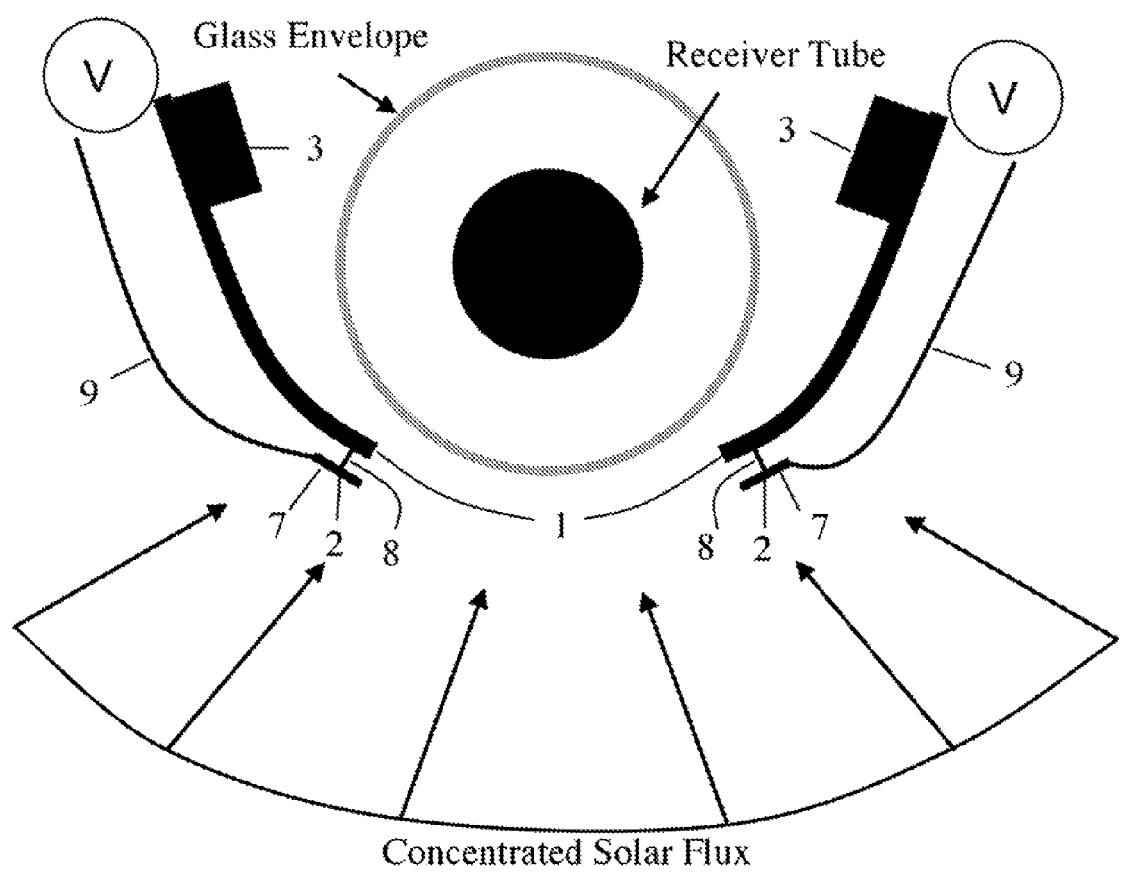
FIG. 4A a schematic view showing a pair tracking heat flux sensors for a line focus (trough) solar collector.

FIG. 4A illustrates another embodiment, comprising a pair of tracking heat flux sensors positioned on opposite sides of a parabolic trough collector. Parabolic trough collectors provide a linear focus through a transparent glass envelope onto a blackened receiver tube filled with oil, water, salt, or other working fluid. The trough flux sensors are similar to the dish flux sensors, and employ pairs of flux sensors mounted on opposite sides of the receiver, with the absorber discs facing outwards away from the receiver tube, and facing towards the trough mirrors. As with the dish closed-loop sensors, tracking is adjusted in a closed-loop manner to balance the two output signals from the sensor pairs. In FIG. 4A, the far (colder) end of a thermal resistor wire 8 (e.g., made of constantan) is attached (e.g., silver-soldered or brazed) to a copper bus 1 that conducts heat and electricity to a heat sink 3, which can be a finned heat sink. The near (hotter) end of the resistor wire 8 is attached (e.g., silver soldered or brazed) to a copper absorber disk 7. The resulting pair of Type-T thermocouple junctions forms the sensing tip 2. An insulated copper wire 9 from the copper disk 7 to a voltmeter 16 completes the circuit. The relatively small diameter of the constantan wire 8 compared to the large dimension (e.g., diameter) of the copper absorber plate 7 increases (i.e., amplifies) the relative copper plate temperature and, hence, increases the output voltage signal. The copper disk's thickness and diameter, and the constantan wire's diameter and length are design variables that determine the strength of the electric signal and the sensor's response time. In some embodiments, the ratio of the area of the absorber plate 7 to the cross-sectional area of the resistor wire 8 can be greater than or equal to 10; alternatively greater than or equal to 50; or alternatively greater than or equal to 100. In other words, the absorber plate 7 has a first area, $A_{absorber}$, that receives incident heat flux; and the resistor wire 8 has a second area, $A_{wire}$, defined by the wire's diameter. In some embodiments, the ratio of the first area divided by the second area, i.e., ($A_{absorber}/A_{wire}$) is greater than or equal to 100.

Copper absorber plate 7 can be circular, square, oval, or rectangular in shape, or some other geometry. Because of the relatively-low solar concentration factor of parabolic trough collectors (as compared to the high concentration factors of dish collectors) output signal amplification by this method is useful.

Optionally, multiple parabolic trough sensors, connected in series and positioned along the axial length on each side of a receiver tube (i.e., glass envelope), can be used to further increase output signal amplitude; as well as to measure the solar flux intensities at different axial locations.

A prototype tracking sensor for a trough application, like that illustrated in FIG. 4A, was fabricated and tested. A proper response was demonstrated on-sun in short-term testing. The prototype used 6 mm (¼ inch) thick copper rod for the bus 1; 1.5-mm (0.060 inch) long, 1-mm (0.040 inch) diameter constantan wire 8; and employed three pairs of sensors. The sensor buses 1 were approximately 15 cm (6 inches) long, and each utilized two 5 cm (2 inch) square copper fin 3 heat sinks. The copper absorber disks 7 in the prototype were about 1-cm (0.4 inch) diameter and 1.5-mm (0.060 inch) thick, and were blackened on the side facing the solar flux.

Figure 4B:
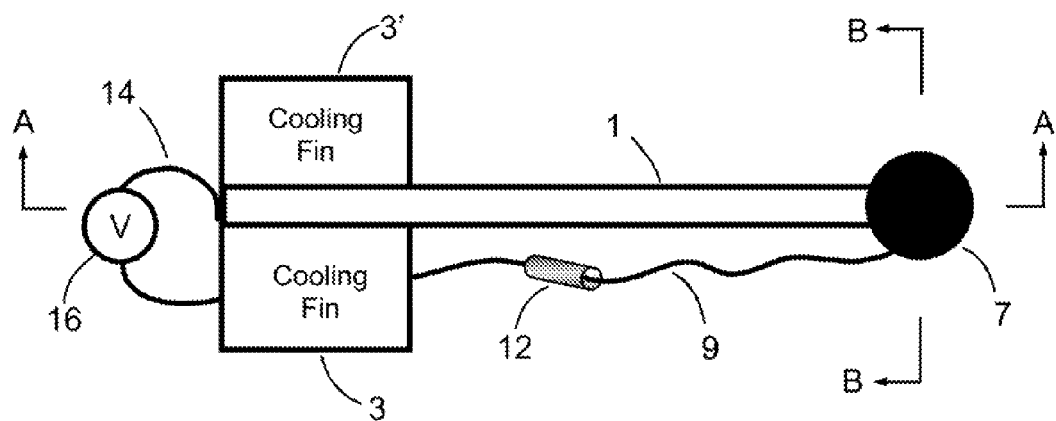
FIG. 4B is a schematic top view showing an embodiment of a tracking heat flux sensor.

FIG. 4B is top view of one of the sensors from FIG. 4A. In this example, heat sink 3 comprises a pair of cooling fins (3, 3') attached to thermal bus 1.

Figure 4C:
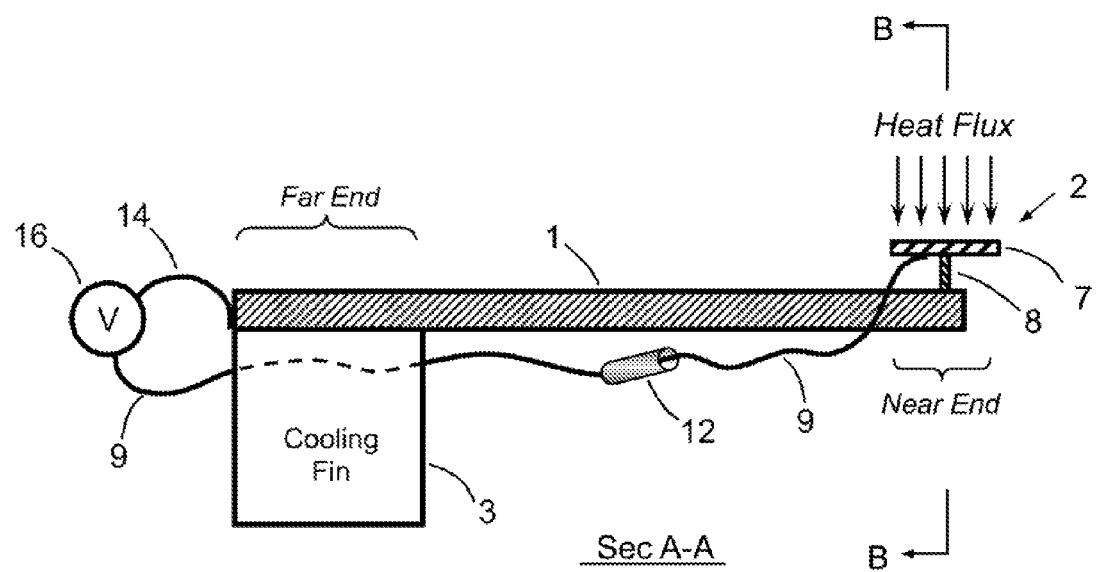
FIG. 4C is a schematic cross-sectional side view showing an embodiment of a tracking heat flux sensor.

FIG. 4C shows a cross-section A-A side view of one of the sensors from FIG. 4A.

Figure 4D:
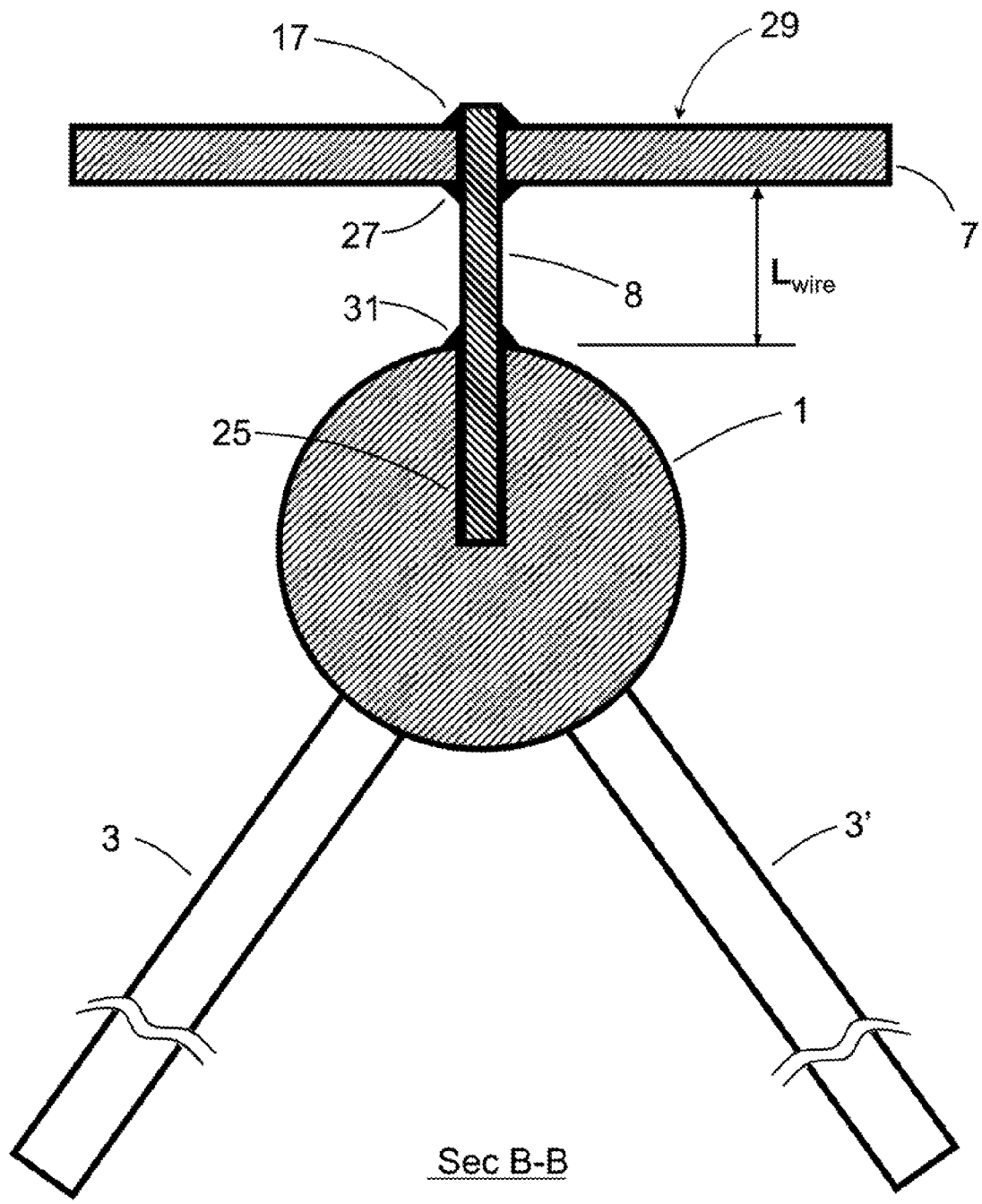
FIG. 4D is a schematic cross-sectional end view showing an embodiment of a tracking heat flux sensor.

FIG. 4D shows a cross-section B-B view looking at the near end of thermal bus 1. In this example, resistor wire 8 is soldered or brazed into partial (or through) hole 25 in bus 1 at the far end of wire 8, and soldered or brazed into through-hole 17 in absorber disk 7 at the near end of wire 8. The distance between solder/braze joints 27 and 31 should be sufficiently large so that the two joints 27 and 31 do not bridge across and touch each other, which would cause an electrical short across resistor 8.

Figure 4E:
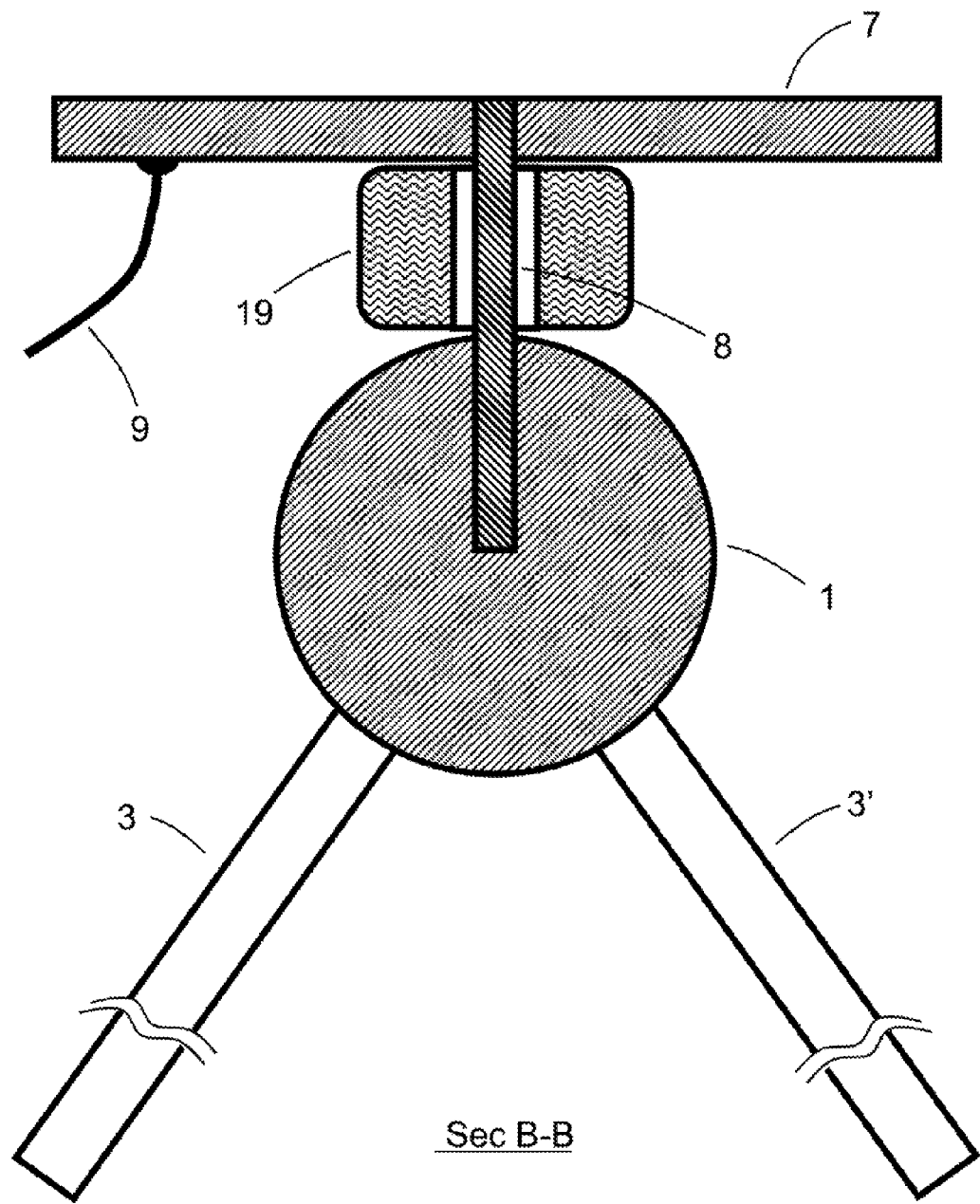
FIG. 4E is a schematic cross-sectional side view showing an embodiment of a tracking heat flux sensor.

FIG. 4E shows a cross-section B-B view looking at the near end of thermal bus 1, and illustrates an example of the use of an electrically-insulating washer or ring 19 that surrounds and physically protects, shields, and electrically insulates resistor wire 8.

Figure 4F:
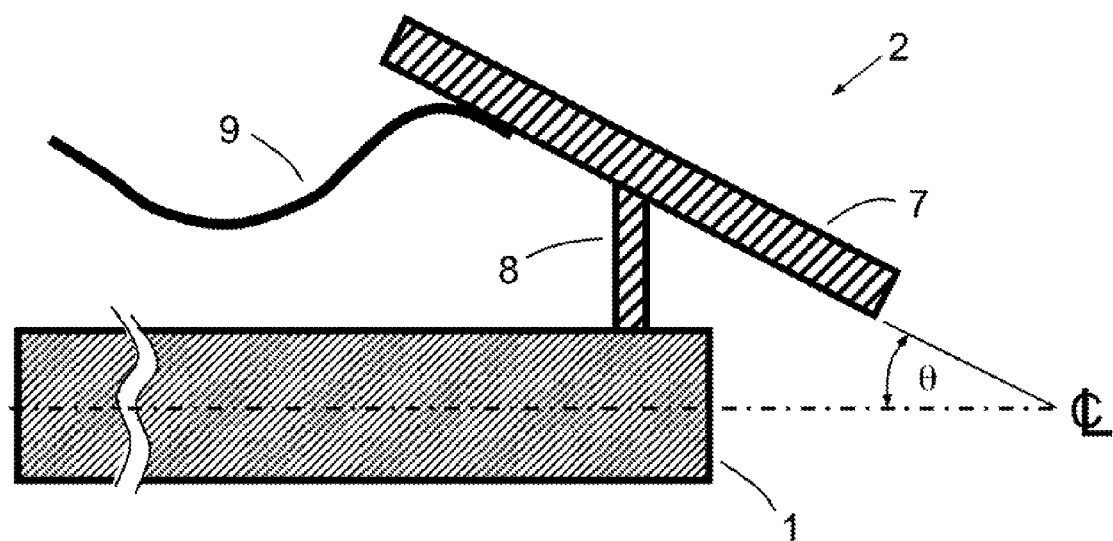
FIG. 4F is a schematic cross-sectional side view showing an embodiment of a tracking heat flux sensor.

FIG. 4F shows a cross-section A-A side view of the sensor of FIGS. 4A and 4B, except that absorber disc 7 is tipped (rotated) at an angle, $\theta$, where $\theta$ is not equal to 0 degrees (i.e., non-parallel to the long axis of thermal bus 1). This option can be used to accommodate, for example, flush mounting of absorber disc 7 within a structure, or for optimally positioning the sensor tip 2 relative to the incident flux to maximize sensor responsiveness. Disc 7 can be tipped (rotated) in one or two different angles (e.g., "pitch" and "roll") with respect to the centerlines of thermal bus 1 and wire 8.

Figure 4G:
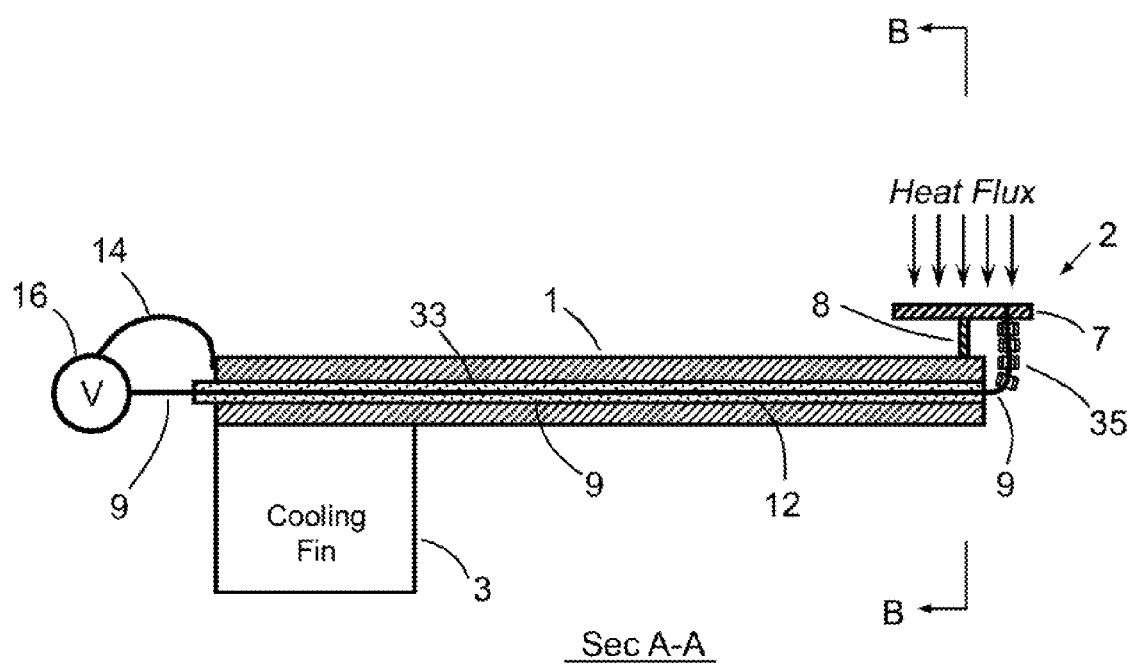
FIG. 4G is a schematic cross-sectional side view showing an embodiment of a tracking heat flux sensor.

FIG. 4G shows a cross-section A-A side view of another embodiment of a tracking sensor. Thermal bus 1 comprises a hollow bar or rod (e.g., a tube) with a central borehole 33 disposed along the entire length of bus 1. Electrical wire 9 is disposed inside of borehole 33, and wire 9 is insulated with insulating material 12. In this way, wire 9 is protected and shielded inside of thermal bus 1. Wire 9 emerges out from the near end of bus 1 and is attached to the underside of absorber disc 7. Ceramic beads 35 insulate the exposed end of wire 9.

Figure 4H:
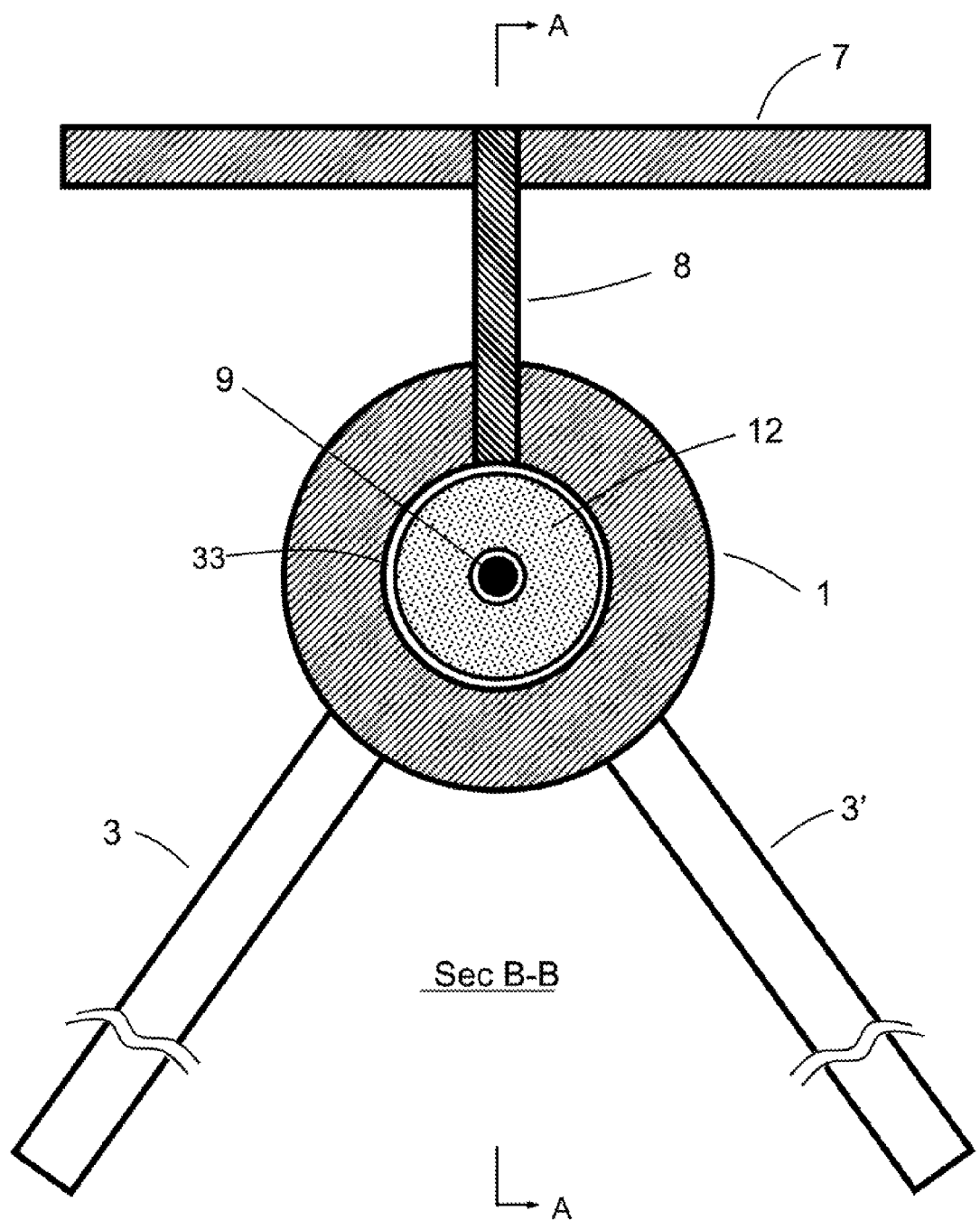
FIG. 4H is a schematic cross-sectional end view showing an embodiment of a tracking heat flux sensor.

FIG. 4H shows a cross-section B-B view looking at the near end of thermal bus 1, of the same tracking sensor as shown in FIG. 4G and described above.

The flux sensors possibilities are not limited to the geometries shown in FIGS. 1-4. Sputtered flux sensors, axial or co-axial arrangements with the electrical leads 9 passing though the constantan resistor 7 and copper bus 1, or similar flux sensor coupled to a heat sink are viable possibilities.

FIGS. 5A-1 (exploded view) and 5A-2 (assembled) illustrate a co-axially arranged tracking heat flux sensor, suitable for line or point-focus collectors. Heat flux absorbed on the absorber disk 7 is conducted through a washer-shaped thermal resistor 8, then through a copper bus 1, and finally rejected through a heat sink 3. A thick-walled copper tube 1 (which can have, for example, a circular, oval, square, or rectangular cross-section) can be used for the bus 1. Resistor washer 8 is attached (e.g. soldered or brazed) and sandwiched between copper absorber disk 7 and the front end of copper bus 1. Thermal bus 1 comprises a hollow bar or rod (e.g., a tube or cylinder) with a central borehole 33 disposed along the entire length of bus 1 and with a front face 44. Copper wire lead 9 is attached (e.g. soldered or brazed) to copper disk 7, and is disposed (contained) inside of tubular bus 1. Ceramic insulation 12 (e.g., ceramic beads, ceramic braided sheath) between the bus 1 and the electrical lead 9 prevents electrical short circuit between the lead 9 and the bus 1.

Figure 5B:
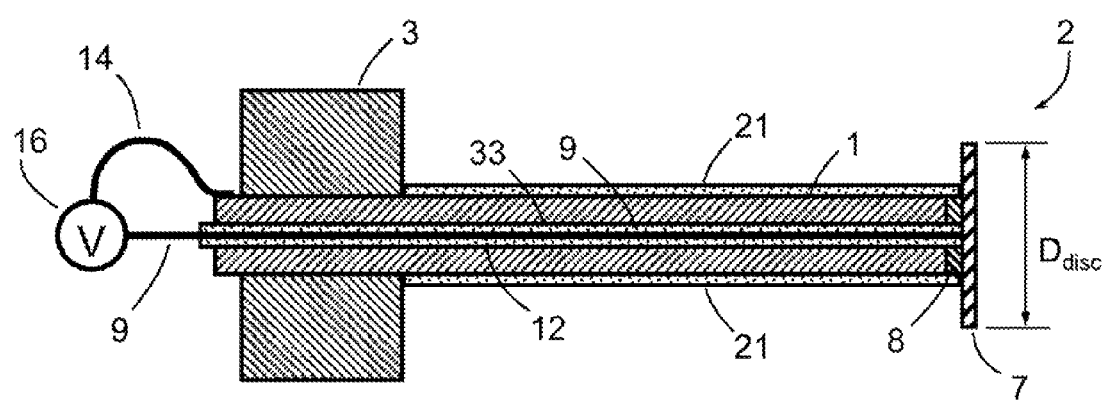

In FIG. 5B an optional external insulating sheath 21 can be used to cover the external surface of bus 1 to help prevent shorting out from the absorber disc 7 and tube 1. Sheath 21 can comprise a tube of a braided ceramic fiber; or sheath 21 can comprise a coating of an insulating material applied directly to the external surface of bus 1 (e.g., by plasma spraying, sputtering, painting, etc.) The copper bus 1 in FIG. 5A can be bent (not illustrated).

Figure 5C:
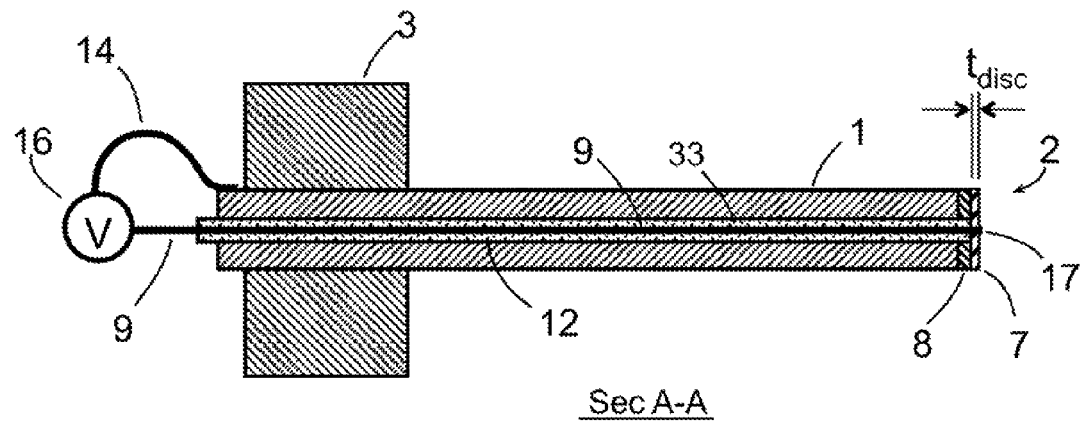

In FIG. 5C, the thickness of absorber disk 7, $t_{disc}$, can be less than the thickness of constantan resistor washer 8 Also, copper lead wire 9 can be inserted up through a hole 17 in disk 7, and then brazed or soldered in place.

Figure 5D:
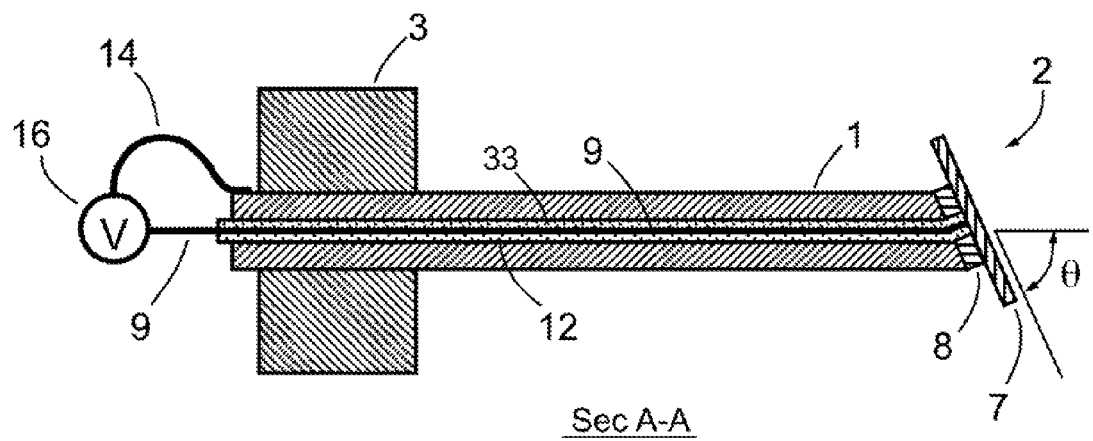

In FIG. 5D the copper disk 7 and constantan washer 8 can be mounted at an non-right angle (e.g., greater than 90 degrees or less than 90 degrees) to the central axis of the bus 1 to accommodate, for example, flush mounting within a collector structure, or for optimally positioning the sensor tip 2 relative to the incident flux to maximize sensor responsiveness.

Depending on the amount of area amplification needed between the area of absorber disc 7 and the cross-sectional area of resistor washer 8 (in order to generate a sufficiently-large voltage signal), the outer diameter of absorber disc 7 can be larger or much larger than the outer diameter of constantan washer 8 (as shown in FIGS. 5A and 5B). Alternatively, the outer diameter of absorber disc 7 can be the same as the outer diameter of constantan washer 8 (as shown in FIG. 5C). In some embodiments, the ratio of the area of the absorber disc 7 to the cross-sectional area of the resistor washer 8 can be greater than or equal to 10; alternatively greater than or equal to 50; or alternatively greater than or equal to 100.

Figure 5E:
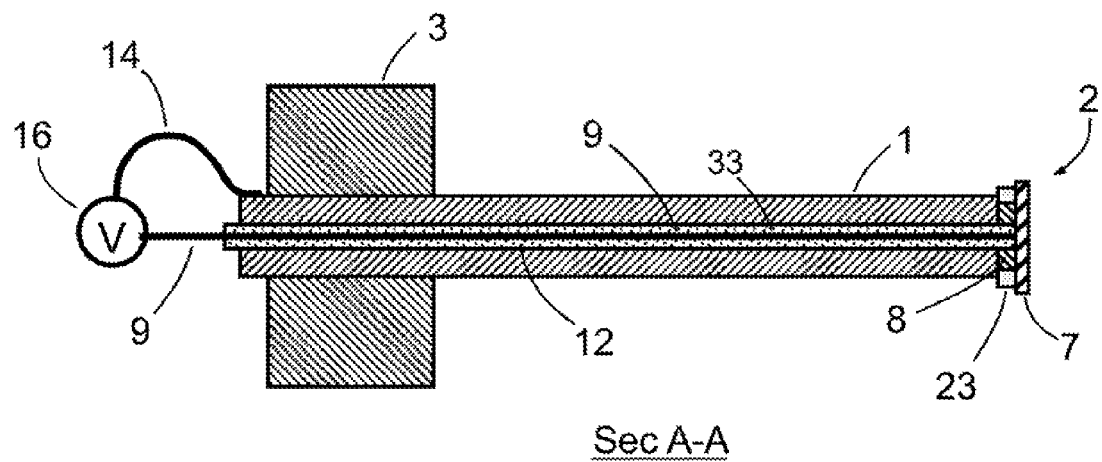

FIG. 5E shows the use of an electrically insulating ring or washer 23, which insulates the outer periphery of thermal resistor washer 8. This can be especially useful when the sensor body (bus 1) passes through the slew plate (see, e.g., FIG. 5F). An electrically insulating ring or washer 23 could also be added to the design showed in FIGS. 3A and 3B, for the same reason.

Figure 5F:
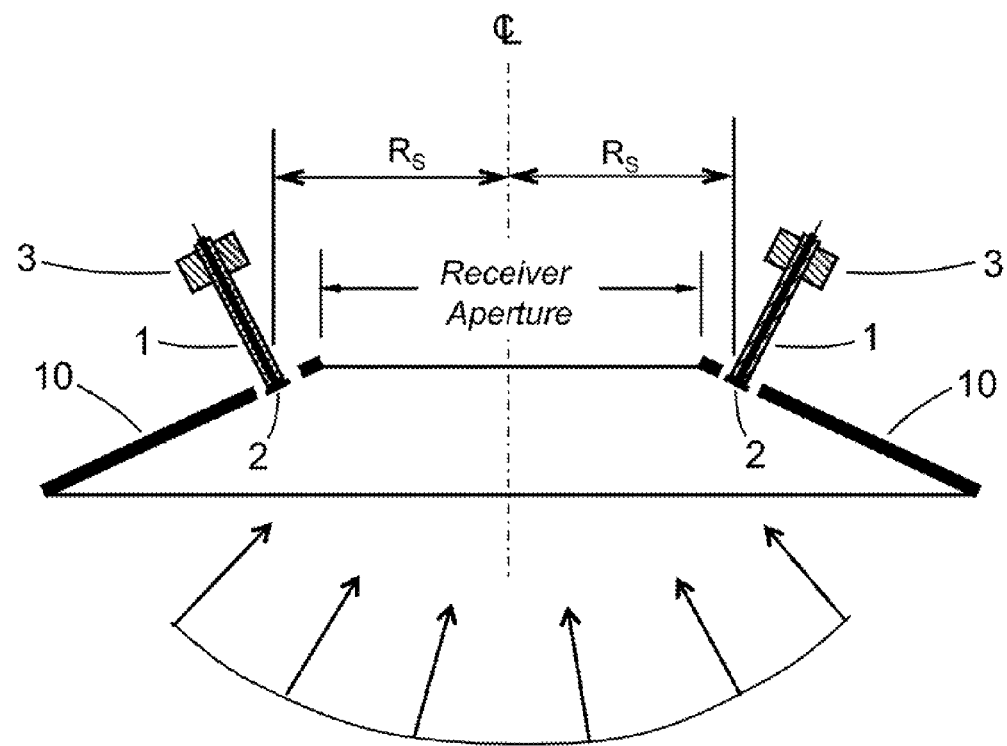
FIG. 5F is a schematic cross-sectional side view showing a pair of tracking heat flux sensors integrated into a conical slew plate for a point focus solar collector.

FIG. 5F is a schematic cross-sectional side view showing a pair of tracking heat flux sensors integrated into a conical slew plate for a point focus solar collector. Each sensor is located equidistant (e.g., radial distance=$R_s$) from the centerline of the receiver aperture (i.e. the centerline of the desired (geometrical) focal point of the concentrated beam of solar heat flux.

Figure 5G:
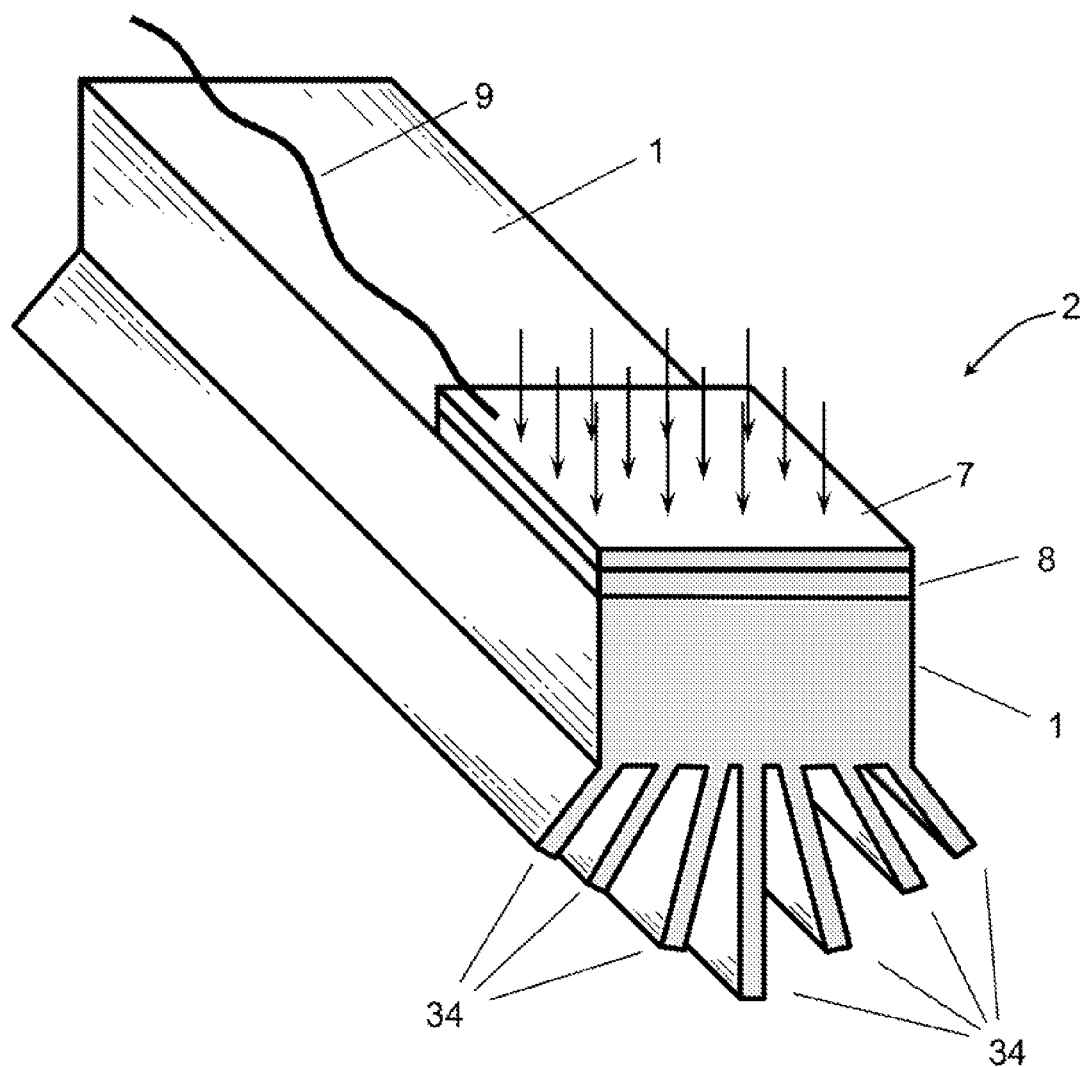
FIG. 5G is a schematic cross-sectional end view through the thermal bus 1 showing an embodiment of a tracking heat flux sensor.

In FIG. 5G, thermal bus 1 comprises one or more cooling fins 34 disposed along the long axis of the bus 1 to increase the cooling capacity of the sensor. These fins can be located on the shaded backside of the thermal bus 1, or other surfaces of bus 1. Cooling fins 34 can be attached or joined as a separate unit to the thermal bus 1. Fins 34 can be made of the same material (e.g., copper) as the thermal bus 1, or made of a different metal (e.g. aluminum). Alternatively, fins 34 can be made as an integral part of thermal bus 1 (e.g., as extruded part, as shown schematically in FIG. 5G. Fins 34 can cover the entire length of bus 1, or, alternatively, cover one or more portions of bus 1. Alternatively, or additionally, fins 34 can extend beyond the back end of bus 1.

Tracking heat flux sensors could also be sputtered or fabricated directly onto the glass envelope of a trough receiver tube, or to the receiver tube directly. The heat sink 3 can be fabricated as part of a bracket or the receiver itself. The sensors could be electrically separate with the individual voltages fed directly into the tracking controller, or the opposing sensors connected in an opposing manner such that a single electrical error signal is read by the controller voltmeter. The need for the use of series connection of sensors could be minimized or eliminated by using modern high gain electronics.

The sensors should have a robust heat sink 3 (passively and/or actively cooled) to properly respond to corrections in tracking without overheating or becoming unstable. A good heat sink also reduces the sensors operating temperature and improves their durability. Although copper and constantan are reasonably resistant to oxidation degradation in air, protective coating of the sensors is recommended. Coating the top surface of the absorber disk 7 (i.e., the surface facing the incoming heat flux) with a black solar-absorptive coating improves response and durability. For the remainder of the sensor components, a white solar-reflective protective coating is recommended. It is desirable that the white protective coating also has a high infrared emissivity. There are a wide range of high temperature paints and powder coats that are suitable.

Figure 6:
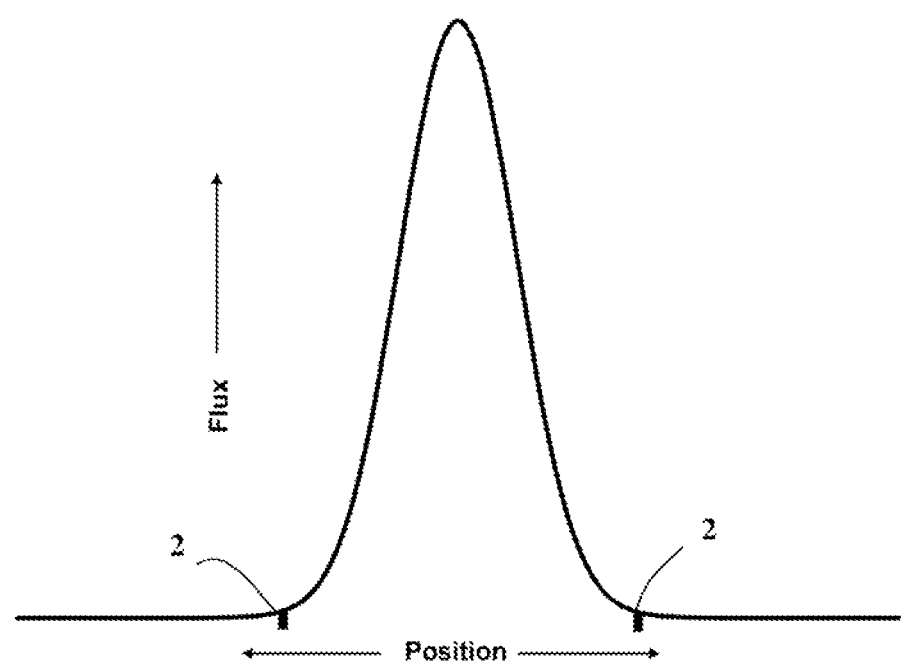
FIG. 6 shows an example of a heat flux distribution in the focal plane of a point-focus concentrating collector and the general location for placing tracking heat flux sensors.

Closed-loop heat flux sensors should be located adjacent to the collector's focus where the flux distribution is well defined and generally unaffected by collector optical errors, collector shading, and uneven coverage by frost, soiling, etc. FIG. 6 shows a typical flux intensity distribution in the focal plane of a point focus collector and the general locations of a pair of closed-loop tracking sensors sensing tips 2. While line focus collectors have a somewhat lower flux intensity and different shape distribution, they have a similar rapidly changing intensity near the edges of the focus. At a minimum, one pair of sensors is required for each tracking axis. It is not necessary that the sensors be positioned along the tracking axis. For example, for dish collectors that track in azimuth (left and right) and elevation (up and down) it is desirable that sun acquisition, or the process of pointing at the collector at the sun, be accomplished from above. That is the collector is aimed at some safe elevation angle above the sun until tracking open loop in azimuth is accomplished and then tracking down in elevation to direct the concentrated solar flux onto the receiver's aperture. This approach has the advantage of safely keeping the concentrated solar energy above the receiver and off the ground during sun acquisition. For this approach placing the four closed-loop tracking sensors at 45, 135, 225, and 315 degrees around the aperture where 0 degrees corresponds to the top of the receiver (the path the concentrated flux crosses) is recommended. In this arrangement the average reading from the sensors at 315 and 45 degrees is compared to the average reading of the sensors at 135 and 225 degrees for tracking in elevation and the average reading of the sensors at 45 and 135 degrees are compared to the average reading of the sensors at 225 and 315 degrees for tracking in azimuth. This approach allows the most intense part of the concentrated flux to pass between the top two sensors (45 and 315 degree positions), preventing sensor damage or abnormally high signals. This approach helps facilitate the transition between open and closed-loop tracking.

Tracking must be reliable, and the transitions between open and closed-loop tracking reliable and reasonably accurate. On dish systems the concentrated flux can reach over 10,000 suns in the region of the aperture and can easily melt anything in its path in a matter of a few seconds. Because closed loop tracking heat flux sensors sense thermal power, they are not as significantly affected by clouds, like photovoltaic or photo resistor sensors are. Because of the fast response of heat flux sensors their response can be used to determine when to transition between open to closed loop tracking. When the response from all of the sensors falls below a specified minimum threshold, tracking should transition to open loop tracking. Similarly, when the response from any one of the tracking sensors achieves a minimum threshold, tracking should transition to closed-loop tracking. Depending on the type of concentrating solar collector system the transition threshold can vary, but is typically 20%-30% of the nominal operating voltage. Accurate open-loop tracking also facilitates the transition between open and closed-loop tracking. The use of closed-loop tracking to establish collector positional and structural errors as described previously can significantly improve the accuracy of open-loop tracking and the transition between open and closed-loop tracking.

The tracking system can comprise a system for tracking a position, along a selected coordinate axis, of a focal point of a concentrated beam of solar energy flux, comprising: a pair of tracking heat flux sensors (according to any of the examples or embodiments described above), comprising a first and a second heat flux sensor; wherein the absorber plate of each sensor is positioned equidistant and on opposite sides from a desired center of the beam's focal point; wherein the front side of the absorber plate of each sensor facing towards the incident solar flux; and a beam position controller means for controlling the position of the beam's focal point along the coordinate axis, by (1) comparing a first voltage difference measured across the first and second electrical leads of the first sensor with a second voltage difference measured across the first and second electrical leads of the second sensor, and then (2) adjusting the beam's focal point position along the coordinate axis until the first and second voltage differences match within an acceptable tolerance.

What is claimed is:

1. A heat flux sensor, comprising:
    an absorber plate made of a first metal, and comprising a front side facing toward an incident heat flux and an opposing back side;
    a thermal bus made of the first metal, and comprising a near end and a far end;
    a thermal resistor made of a second metal different than the first metal, and comprising a first side and an opposing second side; wherein the first side of the thermal resistor is attached to the back side of the absorber plate, and the second side of the thermal resistor is attached to the near end of the thermal bus;
    a first dissimilar metal thermocouple junction located at a first interface between the absorber plate and the resistor;
    a second dissimilar metal thermocouple junction located at a second interface between the resistor and the thermal bus;
    a heat sink attached to the thermal bus;
    a first electrical lead electrically connected to the absorber plate; and
    a second electrical lead electrically connected to the thermal bus or the heat sink;
    wherein a voltage difference is generated across the first and second electrical leads, caused by a Seebeck effect, when a localized heat flux is applied to the front side of the absorber plate and heat is conducted through the absorber plate, then through the thermal resistor to the thermal bus, and finally to the heat sink, thereby causing a temperature difference to develop between the first and second dissimilar metal thermocouple junctions.

2. The flux sensor of claim 1, wherein the first metal comprises copper, and the second metal comprises a constantan alloy; and wherein the first and second junctions comprise type-T thermocouple junctions.

3. The flux sensor of claim 1, wherein the thermal bus comprises a plate, bar, rod, tube, or cylinder.

4. The flux sensor of claim 2, wherein the first and second electrical leads comprise insulated copper wires.

5. The flux sensor of claim 1, wherein the heat sink and/or the thermal bus comprises one or more cooling fins.

6. The flux sensor of claim 1, wherein the heat sink comprises active cooling means for actively-cooling the heat sink selected from the group consisting of air-cooling, water-cooling, refrigerant-cooling, and evaporative-cooling, and combinations thereof.

7. The flux sensor of claim 1, wherein the thermal bus comprises means for enhancing heat transfer from the near end to the far end of the thermal bus, selected from the group consisting of (1) a heat pipe structure embedded inside or attached alongside the thermal bus, and (2) cooling channels embedded inside of the thermal bus for carrying flowing air, flowing liquid, flowing water plus ethylene glycol antifreeze, or combinations thereof.

8. The flux sensor of claim 1, wherein the thermal bus comprises one or more cooling fins located on a shaded backside of the thermal bus.

9. The flux sensor of claim 1, further comprising a heat shield disposed to shield the thermal bus and heat sink from incident heat flux, while not shielding the absorber plate.

10. The flux sensor of claim 1, wherein the thermal bus comprises an oxide-dispersion strengthened copper alloy.

11. The flux sensor of claim 1, wherein the thermal bus comprises a wedge-shaped plate with a narrow tip at the near end of the bus and a wider base at the far end of the bus; and wherein the wedge-shaped plate has a wedge angle that ranges from 10° to 20°; and the absorber plate is located at the narrow tip.

12. The flux sensor of claim 1, wherein the first metal comprises a constantan alloy, and the second metal comprises copper.

13. The flux sensor of claim 1, wherein:
the thermal bus is located on a shaded underside of a slew plate;
the thermal resistor comprises a washer-shaped geometry with a central hole;
the slew plate comprises a through-hole that lines up with the central hole of the washer-shaped resistor, and a copper bushing that surrounds the through-hole in the slew plate; and
the first electrical lead passes through the central hole of the washer-shaped resistor and through the through-hole in the slew plate inside of the copper bushing, and then is routed on the underside of the slew plate, where it can be connected to a voltmeter.

14. The flux sensor of claim 1, wherein the thermal bus and the heat sink are made from a single piece of the first metal.

15. The flux sensor of claim 1, wherein all external surfaces (except for the front side of the absorber plate) comprise a high-emissivity solar-reflective surface; and the front side of the absorber plate comprises a blackened solar-absorbative surface.

16. The flux sensor of claim 1, further comprising a voltmeter for measuring the voltage difference across the first and second electrical leads.

17. The flux sensor of claim 1, wherein the thermal resistor comprises a wire; the wire comprising a diameter, a first end, and an opposing second end.

18. The flux sensor of claim 17, wherein the front side of the absorber plate has a first area, $A_{disk}$, and the thermal resistor wire has a second area, $A_{wire}$, defined by the wire's diameter; and further wherein a ratio of the first area divided by the second area ($A_{disk}/A_{wire}$) is greater than 1.

19. The flux sensor of claim 18, wherein the front side of the absorber plate has a first area, $A_{disk}$, and the thermal resistor wire has a second area, $A_{wire}$, defined by the wire's diameter; and further wherein a ratio of the first area divided by the second area ($A_{disk}/A_{wire}$) is greater than or equal to 100.

20. The flux sensor of claim 18, wherein the absorber plate comprises a circular disk; and the thermal bus comprises a rod.

21. The flux sensor of claim 18, wherein the thermal bus has a centerline along a long axis; and wherein the absorber plate is aligned non-parallel to the centerline of the bus.

22. The flux sensor of claim 18, wherein one end of the resistor wire is embedded in a hole in the absorber plate; and an opposite end of the resistor wire is embedded in a hole in the thermal bus; and wherein the resistor wire is attached at its respective ends with a soldered or brazed joint.

23. The flux sensor of claim 18, further comprising an electrically-insulating ring or washer surrounding the thermal resistor wire.

24. The flux sensor of claim 1,
wherein the thermal bus comprises a hollow tube with a central borehole, a centerline along a long axis of the tube, an inside wall, an outside wall, an open near end, an open far end, and a front face at the near end;
wherein part of the first electrical lead is disposed inside of the central borehole of the tube, and another part of the lead passes out through the open far end of the tube; and
further comprising electrical insulation disposed in-between the first electrical lead and the inside wall of the tube.

25. The flux sensor of claim 24,
wherein the thermal resistor is washer-shaped, with an outer diameter, a central hole, a first side, and an opposing second side; and
wherein the first side of the washer-shaped thermal resistor is attached to the back side of the absorber plate, and the second side of the washer-shaped thermal resistor is attached to the front face of the thermal bus tube.

26. The coaxial heat flux sensor of claim 25, wherein the absorber plate comprises a circular disk having a diameter that is greater than or equal to the outer diameter of the washer-shaped thermal resistor.

27. The coaxial heat flux sensor of claim 25, wherein the absorber plate comprises a circular disk having a thickness that is less than the thickness of the washer-shaped thermal resistor.

28. The coaxial heat flux sensor of claim 25, wherein the front side of the absorber plate is oriented non-perpendicularly to the centerline of the tube.

29. The coaxial heat flux sensor of claim 25, further comprising an electrically insulating ring or washer surrounding the outer diameter of the washer-shaped thermal resistor.

30. The coaxial heat flux sensor of claim 24, wherein the thermal bus tube comprises a thick-walled tube.

31. A tracking system for tracking a position, along a selected coordinate axis, of a focal point of a concentrated beam of solar energy flux, comprising:
a pair of tracking heat flux sensors according to claim 1, comprising a first and a second heat flux sensor;

wherein the absorber plate of each sensor is positioned equidistant and on opposite sides from a desired center of the beam's focal point;

wherein the front side of the absorber plate of each sensor facing towards the incident solar flux; and beam position controller means for controlling the position of the beam's focal point along the coordinate axis, by comparing a first voltage difference measured across the first and second electrical leads of the first sensor with a second voltage difference measured across the first and second electrical leads of the second sensor, and then adjusting the beam's focal point position along the coordinate axis until the first and second voltage differences match within an acceptable tolerance.

* * * * *